(12) United States Patent
Bill

(10) Patent No.: US 7,707,262 B1
(45) Date of Patent: Apr. 27, 2010

(54) NEGOTIATING CONTENT CONTROLS

(75) Inventor: David S. Bill, San Francisco, CA (US)

(73) Assignee: AOL LLC, Dulles, VA (US)

(*) Notice: Subject to any disclaimer, the term of this patent is extended or adjusted under 35 U.S.C. 154(b) by 959 days.

(21) Appl. No.: 11/022,928

(22) Filed: Dec. 28, 2004

(51) Int. Cl.
G06F 15/16 (2006.01)
(52) U.S. Cl. .................. 709/207; 709/204
(58) Field of Classification Search ......... 709/204–206, 709/207, 229
See application file for complete search history.

(56) References Cited

U.S. PATENT DOCUMENTS

| | | | |
|---|---|---|---|
| 5,963,913 A * | 10/1999 | Henneuse et al. | 705/9 |
| 6,453,336 B1 * | 9/2002 | Beyda et al. | 709/204 |
| 6,496,201 B1 * | 12/2002 | Baldwin et al. | 715/753 |
| 6,704,769 B1 * | 3/2004 | Comstock et al. | 709/204 |
| 6,785,868 B1 * | 8/2004 | Raff | 715/205 |
| 6,807,563 B1 * | 10/2004 | Christofferson et al. | 709/204 |
| 6,963,900 B2 * | 11/2005 | Boyd | 709/204 |
| 7,082,402 B2 * | 7/2006 | Conmy et al. | 705/8 |
| 7,124,166 B2 * | 10/2006 | Brown | 709/204 |
| 7,133,504 B2 * | 11/2006 | Fostick | 379/88.14 |
| 7,139,807 B2 * | 11/2006 | Comstock et al. | 709/207 |
| 7,149,810 B1 * | 12/2006 | Miller et al. | 709/246 |
| 7,159,008 B1 * | 1/2007 | Wies et al. | 709/206 |
| 7,295,657 B1 * | 11/2007 | Keohane et al. | 379/88.23 |
| 7,298,831 B1 * | 11/2007 | Keohane et al. | 379/88.23 |
| 2001/0052019 A1 * | 12/2001 | Walters et al. | 709/231 |
| 2002/0055974 A1 * | 5/2002 | Hawkes et al. | 709/204 |
| 2003/0078972 A1 * | 4/2003 | Tapissier et al. | 709/204 |
| 2004/0006595 A1 * | 1/2004 | Yeh et al. | 709/204 |
| 2004/0008635 A1 * | 1/2004 | Nelson et al. | 370/260 |
| 2004/0230651 A1 * | 11/2004 | Ivashin | 709/204 |
| 2005/0125737 A1 * | 6/2005 | Allen et al. | 715/758 |
| 2005/0259803 A1 * | 11/2005 | Khartabil | 379/202.01 |
| 2005/0262201 A1 * | 11/2005 | Rudolph et al. | 709/205 |
| 2005/0262203 A1 * | 11/2005 | Buchheit et al. | 709/206 |
| 2006/0047748 A1 * | 3/2006 | Kelso et al. | 709/204 |
| 2006/0053196 A1 * | 3/2006 | Spataro et al. | 709/205 |
| 2006/0053380 A1 * | 3/2006 | Spataro et al. | 715/753 |
| 2006/0095515 A1 * | 5/2006 | Forstadius | 709/205 |
| 2006/0179110 A1 * | 8/2006 | Brown | 709/204 |

OTHER PUBLICATIONS

Dan Rayburn, "Eyes on the Enterprise", Streaming Media, Inc., 2004, pp. S2-S3.

Larry Bouthillier (Harvard University) and Tim Napoleon (VitalStream, Inc.), "Streaming Media's Success Story", 2004, pp. S4-S7.

Andrew Olson, "Media in the Real World", thePlatform, 2004, pp. S8-S10.

(Continued)

Primary Examiner—William C Vaughn, Jr.
Assistant Examiner—Scott Christensen
(74) Attorney, Agent, or Firm—Fish & Richardson P.C.

(57) ABSTRACT

Access to an electronic conference may be administered by receiving an electronic instruction configured to establish the electronic conference, enabling more than one user to generate content restrictions that limit content rendered during the electronic conference, analyzing one or more participant devices to ensure compliance with the content restrictions, establishing the electronic conference in accordance with the content restrictions, and enabling user access to the electronic conference consistent with the content restrictions.

24 Claims, 11 Drawing Sheets

OTHER PUBLICATIONS

"How to Get Started With Digital Rights Management", Playstream, LLC, 2004, pp. S12-S13.

James A. Dias, "Connect, Record, Share", Sonic Foundry, Inc., 2004, pp. S14-S15.

Chris Saito, "Business Video Breaks Down Borders", Kontiki, Inc., 2004, pp. S16-S17.

Mike Savic, "Enterprise Video Streaming Applications and Products", VBrick Systems, Inc., 2004, pp. S18-S19.

"Simplifying Rich Media Communications", IBM, Cisco Systems, and Media Publisher, Inc., 2004, pp. S20-S21.

Nathan Raciborski, "It's All in the Delivery", Limelight Networks, 2004, pp. S22-S23.

* cited by examiner

200

In establishing the session, some disagreements related to content restrictions have been identified.

In particular,

YOU have requested archiving for subsequent access

PERSON A refuses to participate if the conference is archived
PERSON B requires the conference to be archived and asks for consent upon subsequent access.

To resolve, we propose archiving the conference for 30 days except for:

PERSON A's contribution to the conference.

Is this OK?

YES    NO

Fig. 2

NEGOTIATING CONTENT CONTROLS

TECHNICAL FIELD

This document relates to conferencing technologies.

BACKGROUND

Electronic conferencing generally describes a process whereby conferencing participants can communicate remotely with one another through the use of a client. The client may include one or more of a keyboard to exchange text communications, a microphone to exchange audio communications, and/or a video camera to exchange video communications.

SUMMARY

In one general sense, access to an electronic conference may be administered by receiving an electronic instruction configured to establish the electronic conference, enabling more than one user to generate content restrictions that limit content rendered during the electronic conference, analyzing one or more participant devices to ensure compliance with the content restrictions, establishing the electronic conference in accordance with the content restrictions, and enabling user access to the electronic conference consistent with the content restrictions.

Implementations may include one or more of the following features. For example, access to the electronic conference may be enabled through a telephone network or through an instant messaging interface. Enabling user access to the electronic conference may include regulating which user identities are subsequently allowed to access reproductions of the electronic conference. Enabling user access to the electronic conference may include regulating which systems are subsequently allowed to access reproductions of the electronic conference. Enabling user access to the electronic conference may include regulating which streams of content within the electronic conference may be accessed.

A watermark capability may be negotiated between the users prior to establishment of the electronic conference, and a watermark indicative of the content restrictions may be inserted into content of the electronic conference.

Proposed content restrictions provided by the more than one user may be received. The proposed content restrictions may be compared to identify one or more disputed parameters in the proposed content restrictions. The more than one user may be prompted to resolve the disputed parameters by highlighting the disputed parameters and asking the more than one user to select a value for the disputed parameters. Agreed-to parameters appearing in the proposed content restrictions may be locked down so that the more than one user cannot change a status of the agreed-to parameters.

Identifying the disputed parameters may include identifying parameters in the proposed content restrictions for which all of the more than one users do not agree. Identifying the disputed parameters may include identifying parameters in the proposed content restrictions for which a majority of the more than one user do not agree.

Prompting the more than one user to resolve the disputed parameters may include removing parameters having less than a threshold of support.

Removing parameters having less than a threshold of support may include removing parameters that none of the users supported, removing parameters that less than a specified portion of users supported, and removing parameters that less than a specified number of users supported.

Prompting the more than one user to resolve the disputed parameters may include removing parameters associated with a greater risk for improper use. Prompting the more than one user to resolve the disputed parameters may include enabling the users to select from smaller subset of default parameters.

Proposed content restrictions provided by the more than one user may be received and compared. One or more disputed parameters may be identified in the proposed content content restrictions so that the disputed parameters may be substituted with default parameters.

Proposed content restrictions provided by the more than one user may be received and compared. One or more disputed parameters may be identified in the proposed content content restrictions. A limited exchange of prompts may be exchanged with the more than one user to resolve the disputed parameters by highlighting the disputed parameters and asking the more than one users to select a value for the disputed parameters. After the limited exchange of prompts has been performed, the disputed parameters may be substituted with default parameters.

Content restrictions from the more than one user that differ by at least parameter between different users may be received. The content restrictions may be assimulated into an electronic agreement.

Assimilating the content restrictions into an electronic agreement may include exchanging proposals and counterproposals until all conference participants agree to identical content restrictions.

Agreeing to identical content restrictions may include agreeing to allow a first user to have a different capability than a second user.

Assimilating the content restrictions into the electronic agreement may include exchanging proposals and counterproposals until a majority of users agree to identical content restrictions. Assimilating the content restrictions into the electronic agreement may include exchanging proposals and counterproposals using content restrictions provided by a conference manager designated as required parameters and using other content restrictions that are not required parameters. Assimilating the content restrictions into the electronic agreement may include enabling a limited exchange of proposals and counterproposals, identifying compromise parameters likely to be acceptable to one or more users, and using the compromise parameters for the electronic agreement.

Establishing the electronic conference may include enabling one or more users to exchange sidebar communications, wherein the sidebar communications represent private communications exchanged between a user-defined subset of conference participants. Enabling user access to the electronic conference consistent with the content restrictions includes selectively enabling users to exchange sidebar communications consistent with sidebar-oriented content restrictions. Enabling one or more users to generate content restrictions includes specifying whether a user may (1) use screen capture software, (2) use stream recording software, (3) access archived content, (4) refuse participation when other users do not agree to specified content restrictions, (5) require specified content restrictions, (6) specify how input from the user may be used, or (7) specify that a royalty must be paid. Analyzing the participant devices may include probing for screen capture software, stream recording software, or an electronic microphone attached to the participant device.

DESCRIPTION OF DRAWINGS

FIG. 2 illustrates an exemplary user interface presented on a client during establishment of an electronic conference.

DETAILED DESCRIPTION

Figure 1:
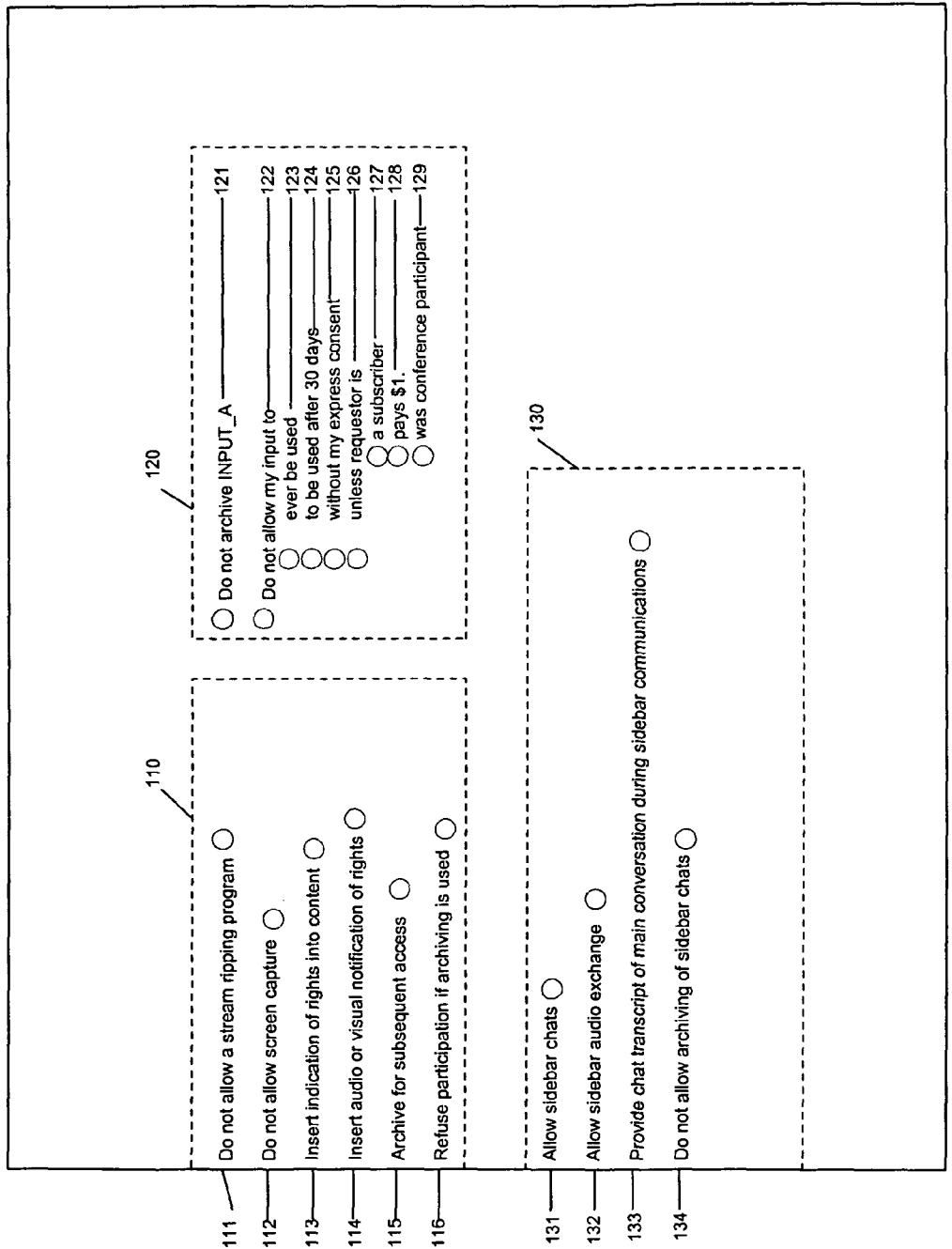
FIG. 1 illustrates an exemplary user interface enabling a user to specify content restrictions.

The ever-increasing power of communications networks and the increasing sophistication of communications applications have placed electronic conferencing tools in the hands of many users. These electronic conferencing tools may be used. For example, as a collaborative business application, a social tool, or a source of entertainment. Often, a robust electronic conferencing application may be invoked through a seemingly simpler communications application, such as an instant messaging application. For example, an instant messaging application may include an audio or videoconferencing client that enables an instant messaging user to use a microphone or video camera in an electronic conference. Even where a user does not have a microphone or video camera, the user may perceive content rendered by others so equipped, and may enjoy the electronic conference as a passive participant or may participate by entering text using a keyboard.

While the electronic conferencing applications are become increasingly sophisticated and popular, a number of factors cause user concern. Some of the concerns may include fears that content exchanged during an electronic conference may be freely distributed. The free distribution of electronic conferencing content may violate a copyright provision, threaten privacy interests, prevent conference participants from having frank exchanges, and even preclude some conference participants from participating altogether. In some cases, the content generated and exchanged during an electronic conference may represent originally created or derivative copyrighted works.

Furthermore, the content generated and exchanged during an electronic conference may represent valuable content. Depending on the underlying purpose of the electronic conference, the content may represent valuable instruction and feedback, marketing data, or cherished communications between family members. Entertainers may use an electronic conference to increase the presence and accessibility of a popular media asset, such as a talk show host. Businesses may use the electronic conference to collaborate and exchange ideas.

To realize the full potential of electronic conferencing, access to an electronic conference may be administered in accordance with content restrictions designed to protect the interests of one or more parties to the electronic conference. Thus, an electronic conferencing host may receive an electronic instruction configured to establish an electronic conference. Users may generate content restrictions that limit content rendered during the electronic conference. Electronic clients that are to participate in the conference may be analyzed to ensure compliance with the content restrictions. The electronic conference is established in accordance with the content restrictions to enable user access to the electronic conference consistent with the content restrictions.

For example, a media company may seek to use electronic conferencing to increase the appeal of popular artists affiliated with the company. The company may work with an online service provider, such as America Online, to host an electronic conference accessible to a large electronic conferencing audience. Prior to establishing the electronic conference, conference participants may engage in a negotiation over content restrictions that regulate how the electronic conference operates. For example, America Online may request that archives of the electronic conference may not be accessed after 30 days unless a small royalty of $1 is paid. The artists may agree to America Online's royalty provisions in exchange for a percentage of the royalties. The company may insist that stream ripping programs not be used, and may insist on verifying that such stream ripping programs are not being used. Users may similarly request an ability to sing alongside the popular artists and to generate a personal recording so that the users may subsequently access an archive of the recorded 'sing along'. The users also may insist that the recorded 'sing along' only be accessible to the user and the user's immediate friends.

After assimilating the proposed content restrictions from one or more users, possibly through a sequence of negotiations, content restrictions for the electronic conference are established. For example, the content restrictions proposed by America Online, the company, and the user (e.g., content restrictions related to the 'sing along' recording) may be adopted, while the proposed artist content restrictions are not included in the content restrictions. The electronic conference is established using the content restrictions so that users may access the electronic conference in a manner consistent with the content restrictions. As a result, America Online may collect royalties for access to an archive of the electronic conference and the users may be allowed to access their personal 'sing along' recordings.

FIG. 1 illustrates an exemplary user interface (UI) 100 that enables a user to specify desired content restrictions. For example, UI 100 may be presented to a user when the user attempts to establish an electronic conference. The UI 100 includes a general preferences section 110, an archive preferences section 120, and a sidebar preference section 130. In general, a version of the UI 100 is presented to each potential conference participant, so that each participant can set forth desired restrictions. As discussed below, a negotiation process then is used to define a final set of restrictions.

General preference section 110 enables users to specify general preferences pertaining to content distributed during an electronic conference. In particular, a user may select one or more elements in order to generate content restrictions using the selected elements. As shown, element 111 may be selected to not allow stream ripping programs. Element 112 may be selected to not allow screen capture. Element 113 allows an indication of rights to be inserted into the content. In one example shown by element 114, inserting an indication of rights includes inserting an audio of visual representation of the content restrictions when the content is rendered. Separately or in addition, inserting an indication of rights may include inserting a watermark into the content. The watermark may identify the content, identify the protected nature of the content, identify the electronic conference participants, and/or identify a set of permissions regulating how the content may be used. In one implementation, when the watermark does not explicitly indicate content restrictions for the content, the watermark may be used as a reference to retrieve the content restrictions for the content. Element 115 may be selected to archive an electronic conference for subsequent access while element 116 may be selected to indicate a refusal to participate if content from the electronic conference is archived. Other examples of content restrictions may include, but are not limited to, requirements that the content may never be accessed after a certain date, without user's expressed consent, and/or without a payment.

Archive preference section 120 specifies how information distributed during the conference may be archived. In particular, a user may select one or more elements in order to generate content restrictions related to archiving using the selected elements. As shown, element 121 may be selected to not allow archiving of INPUT_A. For example, INPUT_A may represent a user's personal camera or microphone. The user may select element 121 to prevent subsequent access to the user's contributions to the electronic conference. In another example, the user may elect to filter out the content provided by a particular user. By selecting element 122, a user is provided more granular control over their archiving preferences. For example, a user may preclude the user's inputs from ever being used (element 123), to be used after 30 days (element 124), or to be used without the user's expressed written content (element 125). Separately or in addition, element 126 enables the user to selectively enable access to the archive so that the content may not be accessed unless the requestor is a subscriber (element 127), pays a specified amount, such as $1 (element 128), and/or was a conference participant (element 129).

Other examples of archive preferences may include, but are not limited to, enabling archival of content at specified bit-rates (e.g., high bit-rate video capturing is available only to paying customers), specifying a duration of recording allowed (e.g., 10 minutes of free preview for non-paying customers), and/or types of content/documents that may be saved on the user's computer (e.g., MP3, NSV, PDF, or Word).

Typically, sidebar preference section 130 specifies whether sidebar communications are permitted, what forms of sidebar communications are permitted, and how sidebar communications may be archived. Generally, sidebar communications describe private communications between a subset of conference participants. As shown, sidebar preference section 130 includes checkboxes that may be checked to allow sidebar chats (element 131) or audio exchanges (element 132), and to provide a chat transcript of the main conversation during sidebar communications (element 133). An additional checkbox may be used to specify whether sidebar chats may be archived (element 134).

FIG. 2 illustrates an exemplary UI 200 presented on a client during establishment of an electronic conference. UI 200 illustrates a negotiating feature set that enables clients to resolve disagreements related to content restrictions. For example, UI 200 may be presented to a user in response to differing content restrictions entered by different users while completing UI 100. As shown, the recipient, PERSON_A and PERSON_B desire to establish a conference with conflicting content restrictions. Prior to joining an electronic conference, the recipient requests that the conference be archived for subsequent access, e.g., by selecting element 115 in UI 100. PERSON_B requires the conference to be archived, and asks for consent upon subsequent access to the archived content. PERSON_A, on the other hand, refuses to participate if the conference is archived, e.g., by selecting element 116 in UI 100. Therefore, the initial archiving requirements set forth be PERSON_A disagree with those proposed by the recipient and PERSON_B.

To resolve the disagreement between PERSON_A and other clients, UI 200 proposes that conference participants agree to the archiving of the conference for 30 days, except for PERSON_A's contributions. The proposal by the UI 200 may be generated automatically by an automated negotiating agent or created by a person overseeing a conference, such as a discussion or conference moderator. Alternatively, the conference participants may themselves propose new content restrictions to resolve the disagreements. Once a new proposal for content restrictions is ready, an electronic conference manager prompts conference participants to agree to the new set of content restrictions and, upon receiving confirmation that the participants agree, proceeds to establish an electronic conference.

Figure 3:
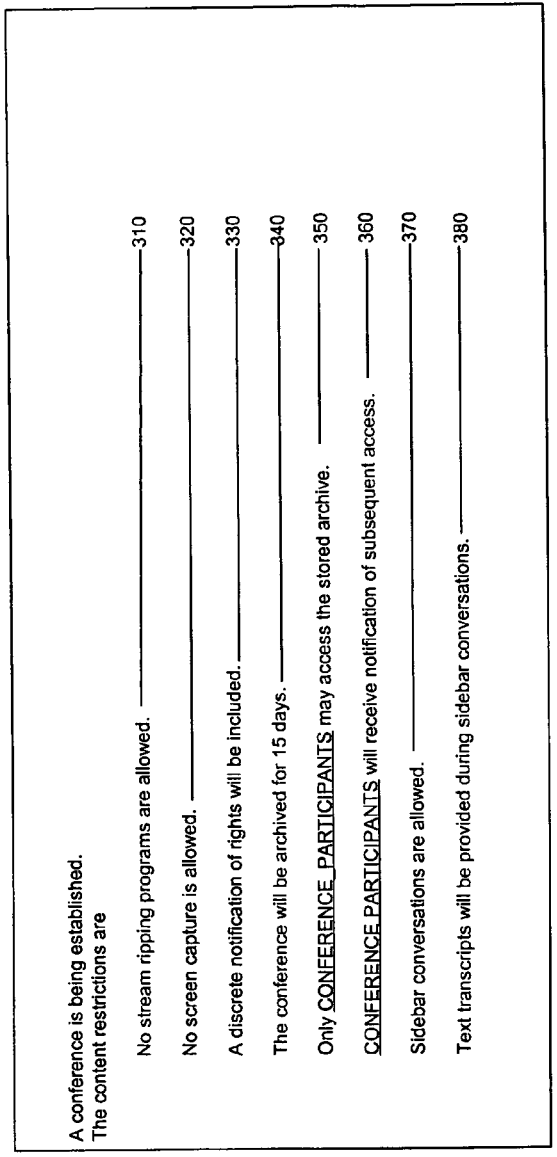
FIG. 3 illustrates an exemplary user interface with an executive summary of content restrictions used in an electronic conference being established.

FIG. 3 illustrates an exemplary UI 300 with an executive summary of content restrictions used in an electronic conference being established. The UI 300 presents the summary to the participating users upon successful resolution of disputed parameters in the proposed content restrictions. The UI 300 includes a list of general content restrictions applicable to all participants. For example, elements 310 and 320 indicate that no stream ripping programs or screen capture programs are allowed. Element 330 indicates that a discrete notification of rights will be included. Element 340 indicates that the conference will be archived for 15 days. In addition, UI 300 may include a list of individual restrictions applicable only to the specific participants. As shown, elements 350 and 360 illustrate that some of the content restrictions relate to a particular group of users, in this case, CONFERENCE_PARTICIPANTS. In particular, element 350 indicates that only CONFERENCE_PARTICIPANTS may access the stored archive, and element 360 indicates that CONFERENCE_PARTICIPANTS will receive notification of subsequent access. As illustrated by the underlining, the CONFERENCE_PARTICIPANTS link presents access to an active form that may be used to retrieve information about the group of users who are participating in the conference and to propose changes to the content restrictions or to another parameter of the conference. Elements 370 and 380 indicate that sidebar conversations are allowed, and text transcripts will be provided during sidebar conversations.

Figure 4:
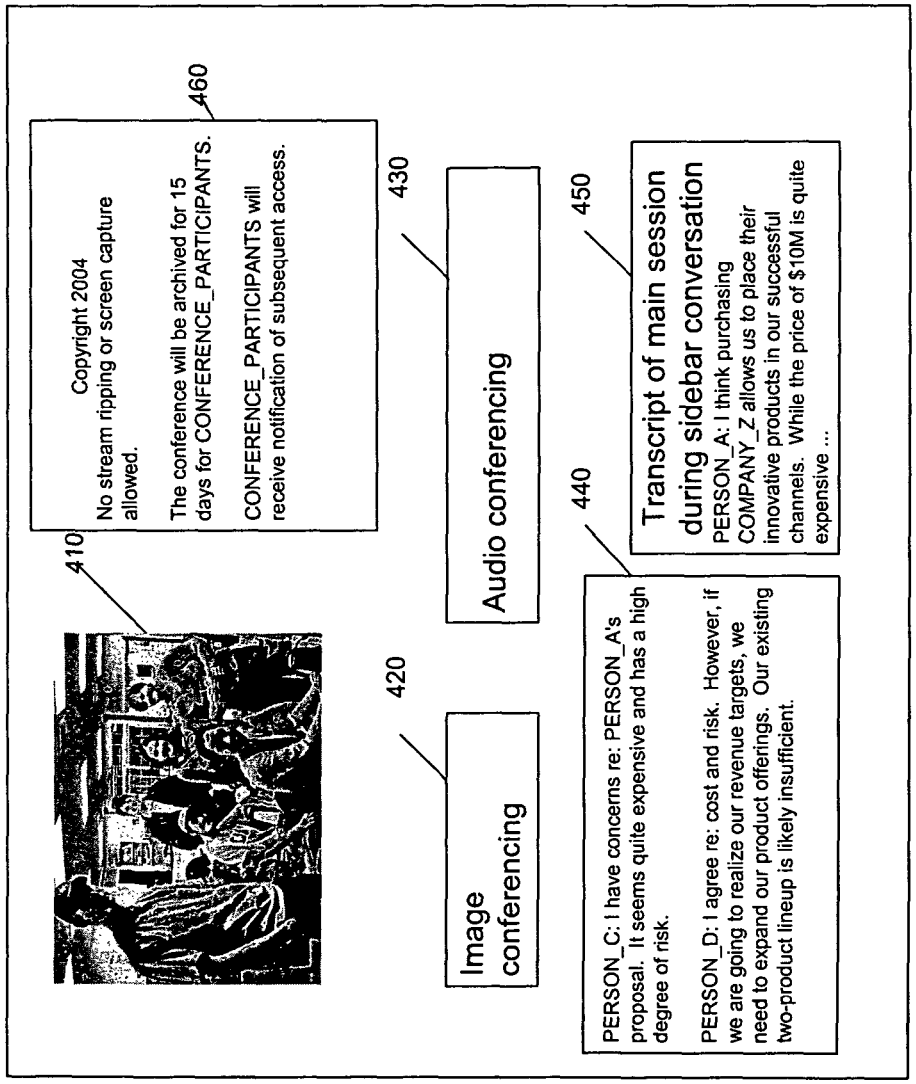
FIG. 4 illustrates an exemplary user interface enabling a user to participate in an online conference.

FIG. 4 illustrates an exemplary UI 400 that enables a user to participate in an online conference. The UI 400 may include one or more of the following sections: a video conferencing section 410, an image conferencing section 420, an audio conferencing section 430, a sidebar section 440, a text conferencing section 450, and a summary of content restrictions section 460.

Typically, video conferencing section 410 features video exchanged during an electronic conference. In one implementation, each conferencing participant has related text and audio conferencing applications, and a conferencing participant currently active may be rendered by the video conferencing section 410.

Image conferencing section 420 is configured to present imaging information in conjunction with an electronic conference. Examples of the imaging information may include photographs of a current speaker or other conference participants, a map, an album cover, a photo for discussion, an emblem, a motif, or a symbol. As desired, the image conferencing section 420 (or the video conferencing section 410) may be expanded to cover the entirety of the UI 400.

The audio conferencing section 430 depicts an audio control or application used in an electronic conference application. The audio conferencing section 430 may represent the audio exchanged between all users as the primary content in an electronic conference. Alternatively, the audio conferencing section 430 may represent the audio associated with a particular conference participant, regardless of whether the conference participant is the primary content.

In some instances, general audio sources generated simultaneously may cause destructive interference that makes them difficult to understand. For this reason, the audio channel may be structured so that one audio channel is broadcast at a time. For example, implementations may commonly manage all audio conferencing applications and apply the same operating instructions to all received audio signals. In one example, receiving several different audio sources simultaneously may cause user confusion or comprehension difficulties that may be avoided through the application of filtering criteria generic to several users. Alternatively, it may be desirable to provide source-specific operating and/or filtering instructions. For example, where the different audio signals are received at different strengths, the conferencing participant may wish to reduce the volume from one conferencing participant and increase the volume from another conferencing participant. In another implementation, a conferencing participant may wish to listen to everything from a first conferencing participant and "mute" or suppress the audio from a second conferencing participant. Each function may be enabled through filtering controls (not shown) that may be accessed using audio conferencing section 430.

The sidebar section 440 relates to communications exchanged between a subset of conference participants. Generally, sidebar sections are used so that smaller communities may privately exchange communications. For example, a conference participant may attempt to privately build a consensus between team members, a conference manager may attempt to privately solicit feedback from a conference participant, or friends may engage in more stimulating conversation if the primary content of the electronic conference is lacking.

As shown, sidebar section 440 shows a sidebar chat exchange between PERSON_C and PERSON_D. Other types of sidebar sections may include videoconferencing sidebars, audio sidebars, or a whiteboard sidebar.

Text conferencing section 450 presents a textual communications interface that enables textual information to be exchanged. In one implementation, text conferencing section 450 represents a transcript of the audio exchanged during the electronic conferencing. In another implementation, text conferencing section 450 represents a chat window used to chat or exchange instant messages.

Text conferencing section 450 may include a textual application common to all conference participants or specific to particular conference participants. In one implementation where text conferencing is a common application to all conference participants, when a conference participant enters a message to be communicated, the conference participant identification may appear next to the message. In implementations of participant-specific text conferencing, the message may be displayed so that it appears in association with its source (e.g., underneath the corresponding participant).

Summary of content restrictions section 460 displays the content restrictions in effect for the electronic conference. As shown, the summary of content restrictions section 460 indicates that (1) no stream ripping or screen capture is allowed; (2) the conference will be archived for 15 days for CONFERENCE_PARTICIPANTS; and (3) CONFERENCE_PARTICIPANTS will receive notification of subsequent access. CONFERENCE_PARTICIPANTS may represent a group identity for one or more conference_participants. Other examples of content restrictions may include those applicable to a subset of those attending the electronic conference. The section 460 also may depict an alarm state when a user attempts to access content in contravention of the content restrictions.

The summary of content restrictions section 460 presents conference participants with content restrictions used during the conference. The summary of content restrictions 460 may include a list of general content restrictions applicable to all participants. In addition, the summary may include a list of individual restrictions applicable only to the specific participants. Finally, some of the more important restriction requirements may be highlighted in the summary of content restrictions section 460 to capture participants' attention. The highlighted fields may emphasize one or more content restrictions. Hyperlinks may be provided to explain the content restrictions and/or provide a tool for the user to control the content restrictions. After a conference is completed, an archived version of the conference may be accessed.

Figure 5:
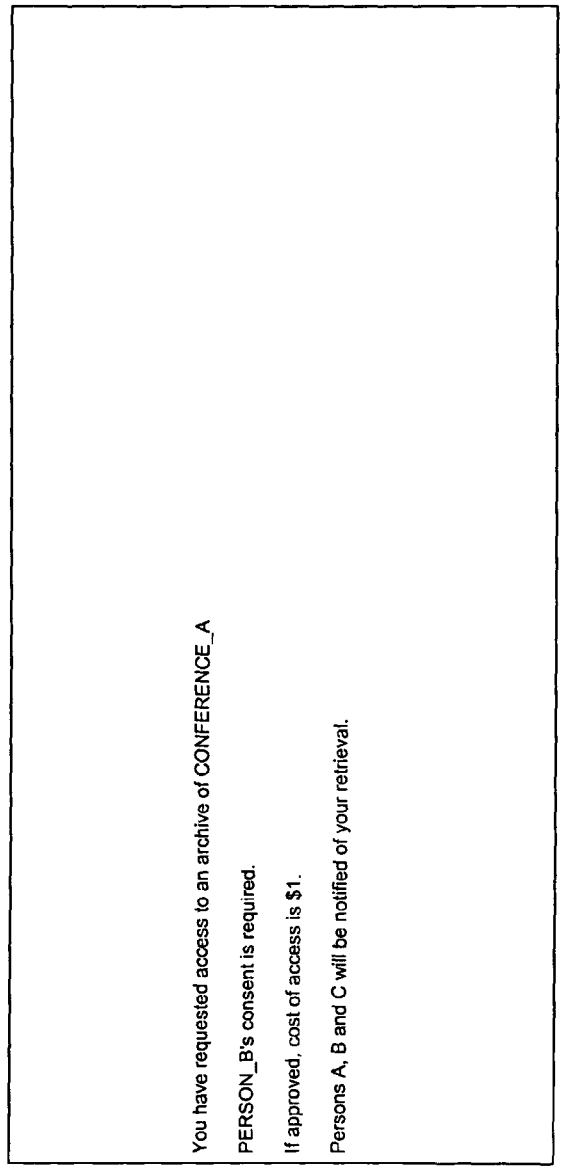
FIG. 5 illustrates an exemplary user interface presented when the user requests access to archived content.

FIG. 5 illustrates an exemplary UI 500 presented when a user requests access to the archived content. In particular, UI 500 indicates that the requestor is attempting to access an archive of CONFERENCE_A. The consent of PERSON_B, who may be a conference participant that insisted on consent during negotiation of the content restrictions, is required. If PERSON_B approves the request, the cost of access is $1, and PERSONS A, B and C will be notified of the retrieval of the archived content.

The system's ability to provide notice of subsequent access to archived content may be useful to a variety of users. For example, PERSON_A may represent an administrator for an online service provider who sponsored CONFERENCE_A, and may elect to receive notification to monitor for improper use, and also to identify use patterns and popular content. PERSON_B may represent an entertainer who jealousy guards his right of publicity. PERSON_C may include a popular host who graciously agreed to participant in CONFERENCE_A, but was curious about how CONFERENCE_A was being used.

Figure 6:
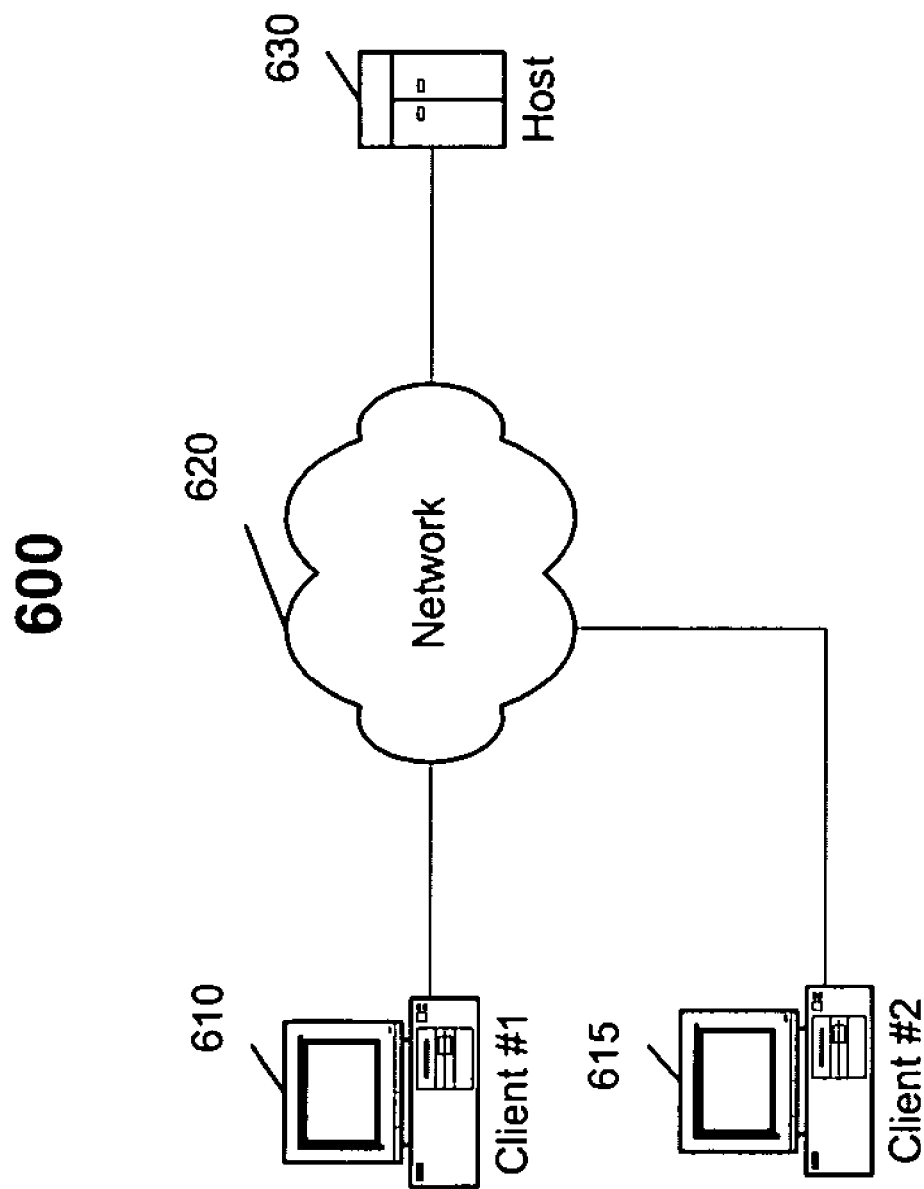
FIG. 6 illustrates an exemplary communications system capable of establishing an electronic conference between multiple participants.

FIG. 6 illustrates an exemplary communications system 600 that is capable of establishing an electronic conference between multiple participants. Communication system 600 may be structured and arranged to include two or more clients 610 and communication software and hardware that enables communications between them. More particularly, the communications system 600 may include a first client 610, a second client 615, a network 620, and a host 630. A client 610 generally exchanges one or more data units across network 620 with a host 630 and/or with client 615 or other clients (not shown).

Each of the client 610 and the client 615 typically includes a computer system that converts a media feed into a stream. The client 610 and the client 615 each may be structured and arranged to send or receive a media stream (e.g., a video or audio feed) across the network 620. The client 610 and the client 615 each may include a general-purpose computer having a central processor unit (CPU) and memory/storage devices that store data and various programs such as an operating system and one or more application programs. Other examples of a client 610 or a client 615 include a workstation, a server, a device, a special purpose device or component, a broadcast system, other equipment, a laptop, a PDA ("Personal Digital Assistant"), a wireless phone, or some combination thereof capable of responding to and executing instructions in a defined manner. The client 610 or the client 615 also typically includes an input/output (I/O) device (e.g., one or more devices having a video and/or audio input and conversion capability) and peripheral equipment such as a communications card or device (e.g., a modem or a network adapter) for exchanging data with the network 620.

For instance, in one implementation, the client 610 includes one or more information retrieval software applications (e.g., a browser, a mail application, an instant messaging client, an Internet service provider client, or an AOL TV or other integrated client) capable of receiving one or more data units. The information retrieval applications may run on a general purpose operating system and a hardware platform that includes a general purpose processor and specialized hardware for graphics, communications and/or other capabilities. In another implementation, client 610 may include a wireless telephone running a micro-browser application on a reduced operating system with general purpose and specialized hardware capable of operating in mobile environments.

Generally, each of client 610 and client 615 participates in an electronic conference by transmitting and receiving streams of data units. However, implementations may include having a client participate in an asynchronous mode. For example, an electronic conference may incorporate a news feed that is being discussed and transmitted by a transmitting participant. In another example, a briefing may be incorporated into an electronic conference to enable wider participation. Other asynchronous modes may include conferencing participants that receive but do not transmit. The network 620 typically includes hardware and/or software capable of enabling direct or indirect communications between the clients 610 and 615 and the host 630. The network 620 may include a direct link between the client 610 and the host 630, or it may include one or more networks or subnetworks between them (not explicitly shown). Each network or subnetwork may include, for example, a wired or wireless data pathway capable of carrying and receiving data. Examples of network 620 include the Internet, the World Wide Web, a WAN ("Wide Area Network"), a LAN ("Local Area Network"), an analog or a digital wired or wireless telephone network (e.g., a PSTN ("Public Switched Telephone Network"), an ISDN ("Integrated Services Digital Network"), or a xDSL ("any form of Digital Subscriber Loop")), and/or a radio network, a television network, a cable network, a satellite network, or some other delivery mechanism for carrying data.

The host 630 may include one or more devices capable of enabling an electronic conference of two or more conferencing participants. The host 630 may include a controller (not shown) that processes instructions received from or generated by a software application, a program, a piece of code, a device, a computer, a computer system, or a combination thereof, to direct operations of the host 630. The instructions may be embodied permanently or temporarily in any type of machine, component, equipment, storage medium, or propagated signal that is capable of being delivered to the host 630 or that may reside with the controller at the host 630. The host 630 may include a general-purpose computer (e.g., a personal computer) capable of responding to and executing instructions in a defined manner, a system or a component in the duplicating switch, other equipment, or some combination of these items that is capable of responding to and executing instructions.

For instance, in one implementation, the host 630 includes one or more scheduling, management, digital rights management, and authentication applications (e.g., calendaring software) capable of establishing and managing one or more electronic conferences. These scheduling and authentication applications may run on a general purpose operating system and a hardware platform that includes a general purpose processor and specialized hardware for graphics, communications and/or other capabilities. In another implementation, host 630 may include a content distribution component (e.g., a server or program) that determines which systems will be used to support an electronic conference. For example, the host 630 may be structured and arranged to provide to the conferencing participants with information identifying which specific device will host the conference (e.g., which device will duplicate and transmit the streams of data units), or to provide to the designated device with the required information and authorization to host the conference.

Implementations of the host 630 may include a service provider or a conference organizer. For example, a service provider may offer conferencing services and arrange or set up conferences. In another example, a conference organizer (e.g., a user putting together an electronic conference) may act both as a host 630 and a client 610. In yet another example, the host 630 includes one or more code segments configured to negotiate and administer content restrictions.

The host 630 may include or be configured to control the operation of one or more distribution devices. In one implementation, the distribution device includes a server. In another implementation, the distribution device includes a duplicating switch. By enabling the host 630 to control the operation of a duplicating switch, an electronic conferencing provider may maximize the performance of duplicating switches while using a more flexible, general-purpose processing capability on a server to administer the more computationally-intensive content restriction system. For example, duplicating switches may be configured to perform content restriction operations associated with network operations while a server is configured to perform content restriction operations that are not able to take advantage of the capabilities of the duplicating switch.

In particular, a duplicating switch may represent a duplicating resource able to distribute large amounts of content to a large number of participants at high bandwidths. Therefore, it may be advantageous to allocate the switch resources to such distribution, and to allocate other resources to the execution of additional operations related to negotiating and administering content restrictions, implementing a digital rights management suite, archiving content, and performing other operations. While many of the operations performed in support of electronic conferencing may be implemented using network operations (e.g., packet replication and filtering), availing to those operations an opportunity to take advantage of the increased performance associated with using a duplicating switch, other operations may not be as well suited towards a duplicating switch implementation. Thus, increased performance may be realized by using a host to perform those electronic conferencing operations not suited for implementation within a duplicating switch, while using the duplicating switch to realize increased performance for those operations that are so suited. And, the general-purpose processing capability of a host may be used to handle the negotiations and establishment of content restrictions. The host may generate a configuration of network operations that is then pushed to a duplicating switch for implementation.

Below, details indicating componentry and functionality of a duplicating switch are described to more fully illustrate its capabilities in content distribution and interoperability with other host resources that may be used to execute the above-noted additional operations. The duplicating switch typically is structured and arranged to receive a stream of data units (e.g., from the client 610), to duplicate the stream of data units, and to transmit the duplicated streams to two or more conferencing participants.

In some implementations, the duplicating switch is structured and arranged to perform filtering and forwarding between different domains at the same level of the protocol stack in the OSI ("Open System Interconnection") reference model. For example, in some networks, the duplicating switch may forward Ethernet frames between different Ethernet segments. In another example, the duplicating switch may forward IP packets between different IP subnets.

Generally, the duplicating switch includes a device that performs network operations and functions in hardware (e.g., a chip or a part of chip). In some implementations, the device may include an ASIC ("Application Specific Integrated Circuit") that implements network operations logic directly on a chip (e.g., that includes logical gates fabricated on a silicon wafer and then manufactured into a chip). For example, an ASIC chip may implement a logical gate structure in silicon to perform filtering by receiving a packet, examining the IP address of the received packet, and filtering based on the IP address.

Implementations of the device included in the duplicating switch may use a Field Programmable Gate Array (FPGA). A FPGA is generally defined as including a chip or chips fabricated to allow third party designers to implement a variety of logical designs on the chip. For example, a third party designer may load a design within a FPGA to replace the received IP addresses with different IP addresses, or may load a design within the FPGA to segment and reassemble IP packets as they are modified while being transmitted through different networks. In another example, the FPGA is configured to perform key management/generation/distribution operations. Other examples of operations may include hardware encryption operations and/or packet inspection/filtering.

Implementations of the device included in the duplicating switch may include a network processor. A network processor generally is defined to include a chip or chips for allowing software to specify network operations to be performed. A network processor may perform a variety of operations. One example of a network processor may include several interconnected RISC ("Reduced Instruction Set Computer") processors fabricated in a network processor chip. The network processor chip may implement software on some of the RISC processors to change an IP address of an IP packet. Other RISC processors in the network processor chip may implement software that determines which conferencing participants are receiving an IP stream.

Although various examples of network operations were defined with respect to different devices, each of the devices may to be programmable and capable of performing the operations of the other devices. For example, the FPGA device is described as the device used to replace IP addresses and segment and reassemble packets; however, a network processor and ASIC are generally capable of performing the same operations.

Figure 7:
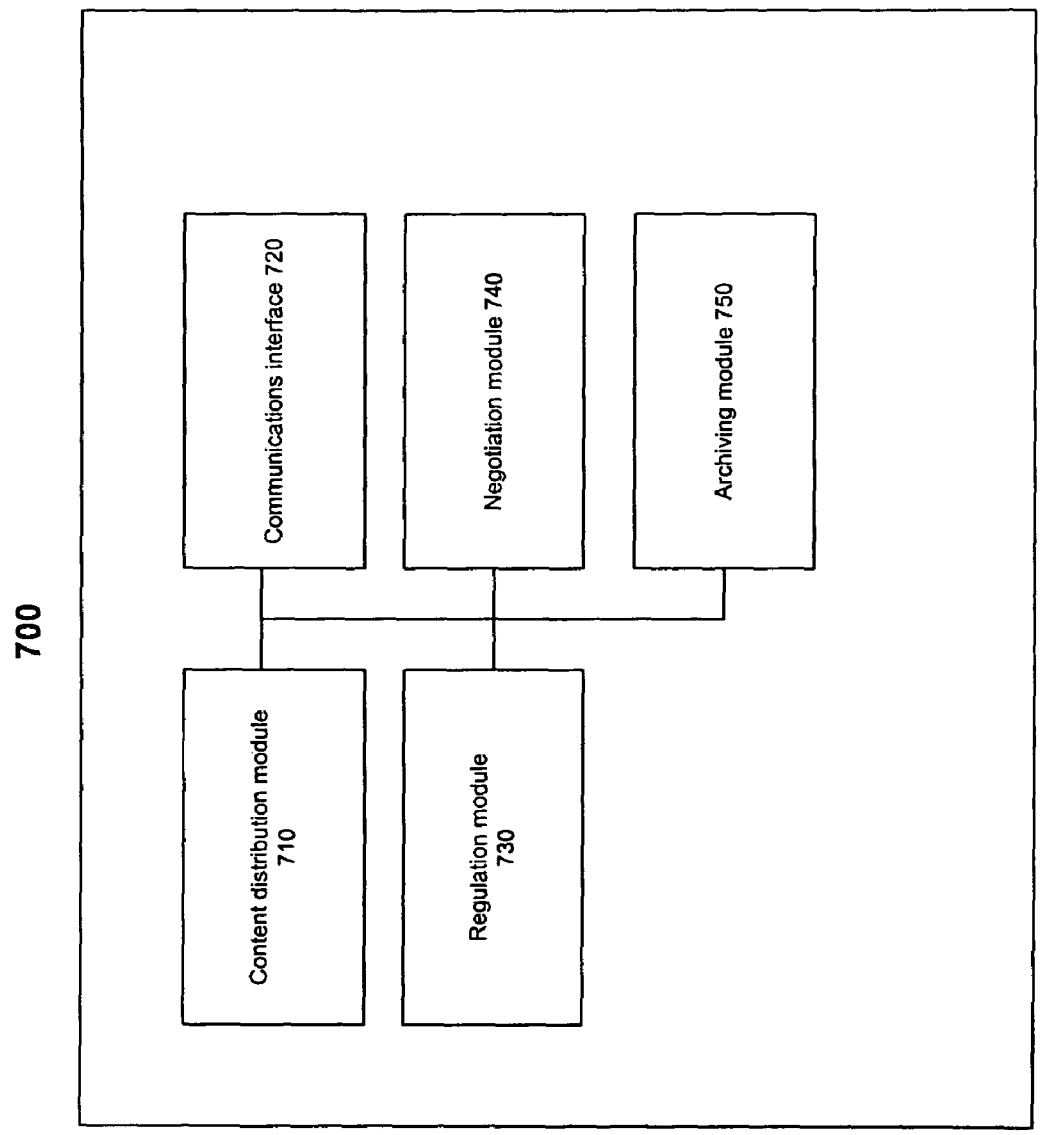
FIG. 7 illustrates a content control system that may be used to generate and enforce content controls for a multiparty electronic conference.

FIG. 7 illustrates a content control system 700 that may be used to generate and enforce content controls for a multiparty electronic conference. The content control system 700 includes a content distribution module 710, a communications interface 720, a regulation module 730, a negotiation module 740, and an archiving module 750. In the system of FIG. 6, the content control system 700 may be implemented by the host 630.

Generally, the content control system 700 enables one or more users to interface with an electronic conference manager and each other through negotiation module 740 to generate content restrictions. The content restrictions then are enforced using the regulation module 730, so that the content distribution module 710 and the archiving module 750 distribute content in manner regulated in accordance with the content restrictions.

The content distribution module 710 may be used to exchange content between conference participants. The content distribution module 710 also may be used to retrieve content from the archiving module 750 for subsequent access.

Generally, the communications interface 720 may be used to enable operation and management of an electronic conference. The communications interface 720 may interface with the content distribution module 710 to distribute content exchanged during an electronic conference, interface with a negotiation module 740 to negotiate parameters in the content restrictions, interface with a regulation module 730 to administer the electronic conference, and/or interface with an archiving module 750 to enable subsequent access to archived content.

Typically, the regulation module 730 is a code segment configured to enforce content restrictions for an electronic conference. Because content restrictions may encompass a variety of tools, formats, and operating modes, the regulation module 730 may be configured to operate in a manner reflective of the underlying content restrictions.

For example, when content restrictions require the use of a trusted media player using a robust digital rights management (DRM) suite, the regulation module 730 may include a server program configured to push DRM settings to the participating trusted media players. In one example, the regulation module 730 is configured to instruct trusted media players to (1) disable microphones and screen capture software; (2) provide the content regulation module 730 with a snapshot of other active applications and processes; and (3) periodically confirm that DRM settings are still in effect.

Alternatively or in addition, when the content restrictions relate to eavesdropping provisions, the regulation module 730 may provide an anti-eavesdropping code segment configured to check for known eavesdropping programs. The content regulation module then may suspend conference establishment until the regulation module 730 has confirmed that conference participants have downloaded the program, checked for eavesdropping programs, and confirmed to the regulation module 730 that eavesdropping programs are not being used.

Another form of content restrictions may include providing asymmetric access to content, such that conference participants are allowed access of differing scope to electronic conference content. For example, in the case of some conference participants who are managers who engage in sidebar conversations during the electronic conference, the regulation module 730 may ensure that only managers are accessing the sidebar conversation. The regulation module 730 also may regulate the manner in which archived content is accessed in a similar way.

Typically, negotiation module 740 is a code segment configured to support the exchange of proposals and counterproposals in order to generate content restrictions used for an electronic conference. For example, the negotiation module 740 may present a user interface, such as the user interface 100 of FIG. 1, that provides a series of prompts with proposed parameters for content restrictions. When two or more users disagree over one or more parameters, the negotiation module 740 may present a user interface, such as the user interface 200 of FIG. 2, that enables exchange of a series of counterproposals so that content restrictions responsive to users' interests may be established.

In one implementation, the negotiation module 740 is configured to exchange counterproposals between conference participants until all conference participants agree to a common set of content restrictions. However, in some implementations, it may not be feasible to reach agreement between all conference participants. As a result, the negotiation module 740 may be configured to establish content restrictions that are reflective of the expressed interest of the user community, even where agreement cannot be reached. For example, the negotiation module 740 may be configured to exchange three rounds of proposed content restrictions. The first round may afford conference participants the opportunity to exchange content restrictions. The second round may render the general sentiments of the conference participants (e.g., 7 of 9 conference participants prefer parameter 1 to parameter 2 and 5 of 9 conference participants prefer parameter 3 to parameter 4), and enables conference participants to change their preferences knowing the preferences of other conference participants. A third round may reveal that some parameters have been 'locked down', that is, parameters previously agreed to can no longer be negotiated, and also affords conference participants a final opportunity to express a preference for a parameter. A parameter may be 'locked down' when complete agreement has been reached, or when a threshold level of support has been reached (e.g., more than 50% of the conference participants agree when three or more parameters are present or 70% of the conference participants agree when two parameters are present). Locking down a parameter may be used to secure a level of agreement so that new disputes cannot be introduced in the later rounds of negotiations. In a similar variation, certain parameters may be removed from a list of available parameters when support for a particular parameter is less than a threshold level of support. Thus, when four options are proposed for a particular parameter appearing in the content restrictions and conference participants only express a preference for two of the options, the two options without conference participant support may be removed from the list of available options.

The negotiation module 740 also may be configured to reduce the negotiation complexity by adopting or favoring certain options in the course of the negotiation. For example, some portions of the content may be deemed more sensitive, such that the consequences of improper use may be associated with a greater adverse impact. In a trusted environment, it is possible that all conference participants will agree to provide all conference participants access to the sensitive information. However, if agreement cannot be reached, the negotiation module 740 may remove the option that allows all conference participants access to the sensitive information. Thus, the negotiation module 740 may specify an option when an agreement cannot be reached, and may do so by selecting one or more parameters for the content restrictions that maximize protection of the privacy interests of the conferencing participants. For instance, maximizing the privacy interests may prevent subsequent access to the contributions of a conference participant without express approval of the conference participant, with such approval being conveyed electronically.

The content restrictions negotiated by the negotiation module 740 need not be symmetric with respect to all conference participants and all content. Rather, the content restrictions may be 1) asymmetric with respect to a piece of content; and/or 2) asymmetric with respect to a conference participant. A content restriction is asymmetric with respect to a piece of content if a first community of users has a different capability than a second community of users with respect to accessing, copying, modifying, and distributing the piece of content. Thus, some conference participants (e.g., a manager) may be allowed to access the piece of content (e.g., a sidebar conversation) while other conference participants are not. Similarly, a content restriction is asymmetric with respect to conference participants if a first user has a different capability than a second user. Thus, a first user may be allowed to use a wireless phone to access an electronic conference while a second user is not. Content restrictions with asymmetric aspects may be established through the negotiation process. For example, a first conference participant may enable universal access without restriction to content provided by the first conference participant while a second conference participant may refuse all access to any content provided by the second conference participant. While the first and second conference participants have specified different options for content restrictions, the asymmetric difference in capabilities does not preclude content restrictions from being generated.

The negotiation module 740 also may manage negotiations between different classes of conference participants, and, in particular, between classes of conference participants where a first class of conference participants is preferred over a second class of conference participants. In one example, the preferred class of conference participants includes a sponsor, creditor, or manager for an electronic conference. The negotiation module 740 may be configured to use one or more parameters in content restrictions provided by the preferred class of conference participants over parameters provided by the non-preferred class. For example, when an electronic conference is sponsored by a preeminent media company (e.g., Time Warner) to enable fan access to a popular entertainer, and the popular entertainer will provide valuable content (e.g., by singing the song by which the artist is known), the negotiation module 740 may be configured to use parameters provided by the preeminent media company. In one implementation, the negotiation module 740 is only configured to favor a subset of content restrictions, such as those parameters designed to protect the interest of the preferred class (e.g., to prevent illicit copying of an artist's song). In another example, the negotiation module 740 is configured to use parameters for any content restrictions, regardless of whether the parameters protect the interest of the preferred class. Thus, a negotiation module 740 may be configured to enable sponsor control over a simultaneous chat to prevent disparaging remarks from being entered into the forum.

The archiving module 750 includes a system configured to archive content generated during the electronic conference so that the content may be subsequently accessed. Because content generated during an electronic conference may include contributions from a number of conference participants, the archive module 750 may be configured to reconstruct portions of the electronic conference to reflect the contributions of specified conference participants. In one implementation, an electronic conference is used as a marketing survey. The marketing survey may introduce one or more items and elicit user response (e.g., by verbal or textual communications). Conference participants may be segmented by demographic so that a marketing manager may replay the response of different segments of the conference participants to gauge the response of particular segments of interest.

Figure 8:
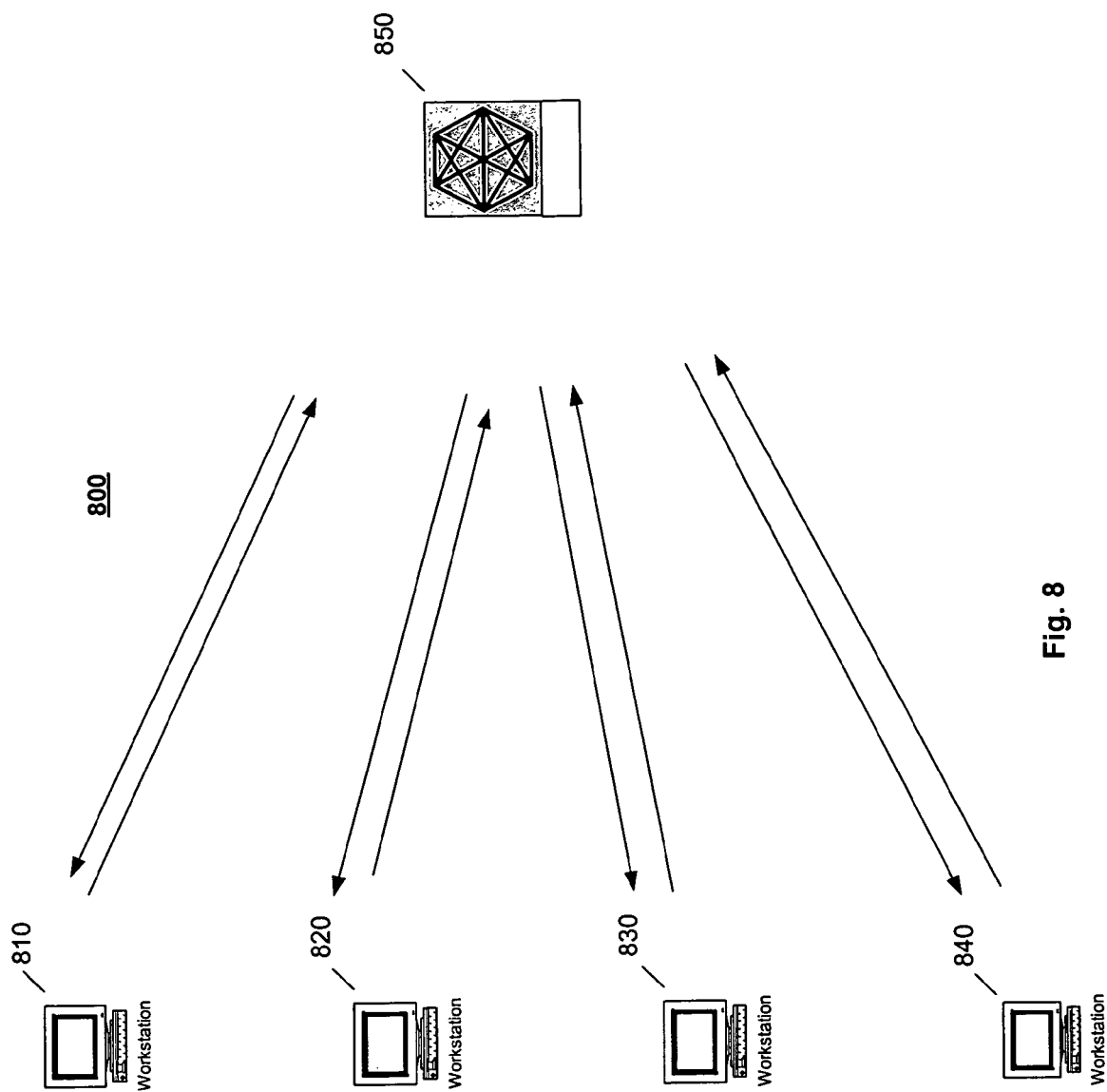
FIG. 8 illustrates the operation of an electronic conference between four conferencing participants.

FIG. 8 illustrates the operation of an electronic conference between four conferencing participants. Conferencing participants 810, 820, 830 and 840 each generally correspond to the clients described with respect to FIG. 6 and duplicating switch 850 generally corresponds to the host duplicating switch described with respect to FIG. 6.

Each of conferencing participants 810, 820, 830, and 840 transmits one stream of data units to the duplicating switch 850 for duplication, and receives the duplicated streams of the other participants in return from the duplicating switch 850. When each conferencing participant receives the stream of data units of all the other conferencing participants, the total number of streams sent out by the switch is 2(N−1), where N is the number of conferencing participants (i.e., the switch sends out six streams when there are four participants). Although FIG. 8 illustrates having each conferencing participant receive the stream of every other conferencing participant, some implementations, particularly those having a large number of conferencing participants, may use intelligent selection and filtering techniques to reduce the number of streams that are transmitted to each participant.

Furthermore, although one duplicating switch is depicted, implementations may include using more than one duplicating switch. For example, several users may initiate an electronic conference at one duplicating switch. However, as additional users join the electronic conference, an electronic conference manager may desire to preserve the intimacy associated with smaller audiences in an electronic conference. Thus, the electronic conference manager may invoke additional duplicating switches, and transfer additional conference participants to the additional duplicating switches as required, so as to keep the number of audience members below an 'intimacy' threshold. The threshold may be specified in the content restrictions. Still, in another implementation, a first duplicating switch with limited available capacity may initiate a connection to a second switch and send all new connections to the second switch. Initiating the connection to the second duplicating switch may include exchanging duplicated data units between the first and second duplicating switches. In another example, when the second duplicating switch is activated, several users may be transferred to the second duplicating switch to be hosted by the second duplicating switch. Implementations also may include intelligent switch selection criteria that activate use of a second duplicating switch. For example, when the duplicating switch determines that several users are located in the same proximity, the duplicating switch may activate an additional switch that is closer to the users to host the conference so that duplicated streams are not being transmitted across large portions of the network. The users may be organized by proximity according to content restrictions so as to align proximate users in an electronic conference.

Figure 9:
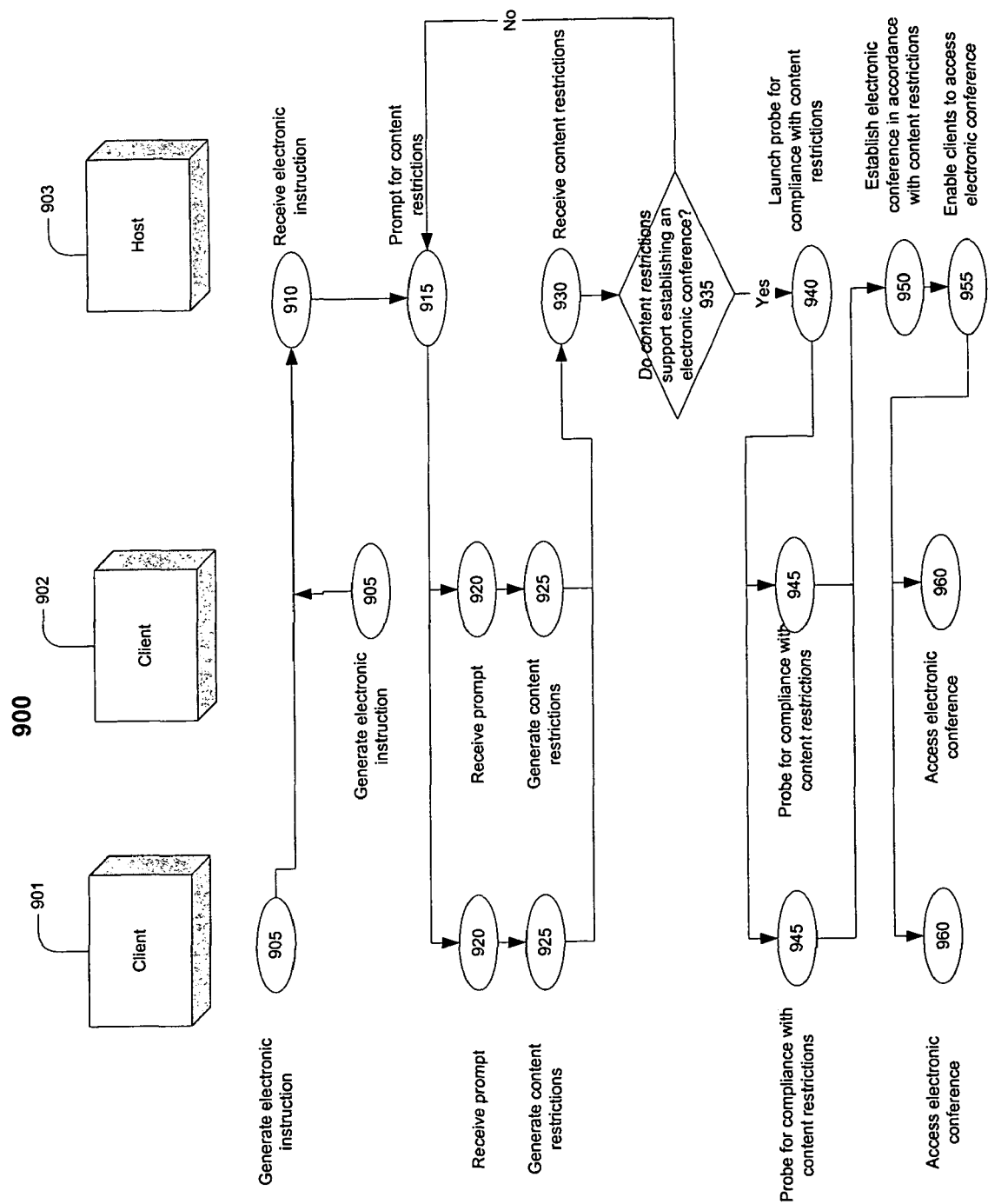
FIG. 9 is a flow chart of an exemplary process by which a client may participate in an electronic conference by accessing a host.

Referring to FIG. 9, flow chart 900 illustrates an exemplary process by which a client 901 may participate in an electronic conference by accessing a host 903. For convenience, particular components and messaging formats described earlier are referenced as performing the process. However, similar methodologies may be applied in other implementations where different components are used to define the structure of the system, or where the functionality is distributed differently among the components shown. For example, users may be organized into a series of chat rooms during a video conference. The users may be organized by location, by interest, by age or by another parameter. The organization may be expressly noted, such as, for example, by notifying the users of the organization in the chat room. Alternatively, the organization may be passive and not expressly provided.

Initially, clients 901 and 902 generate an electronic instruction to host 903 (905). The instruction may include a request to join an online chat session, an electronic conference, or an automated discussion. Typically, the instruction is generated by client software that allows each of the client 901 and the client 902 to exchange information with corresponding software running on the host 903. Each of the client system 901 and the client system 902 communicates with the host 903 through various channels, such as a modem connected to a telephone line or a direct Internet connection using a transfer protocol such as Transfer Control Protocol/Internet Protocol (TCP/IP).

Once the host 903 receives electronic requests from the clients wishing to join a chat session or an electronic conference (910), the host 903 prompts for content restrictions (915). The client 901 receives the prompt (920). For example, the prompt displayed on clients 901 and 902 may present the prompt for content restrictions shown in UI 100. Typically, prompting for content restrictions enables a user to select a set of desired content restrictions for an electronic conference. Content restrictions may regulate the subsequent reproduction of the content generated during the electronic conference. Examples of content restrictions may include, but are not limited to, preferences related to screen capture, stream ripping, or archiving. Clients 901 and 902 generate content restrictions (920) and transmit content restrictions back to the host 903 (925).

Host 903 receives content restrictions (930). The host 903 determines whether content restrictions support establishing a conference (935). For example, the host 903 determines whether the content restrictions specified by clients are in accord with each other and thus allow conference establishment. If content restrictions do not support establishment, (e.g., users cannot agree on content restrictions), the host 903 may once again prompt clients for content restrictions (915). For example, if one of the clients initially disallowed screen capture while other clients revised the screen capture feature, the host 903 may generate an additional prompt indicating that the conference cannot be established due to a disagreement related to screen capture. Furthermore, the prompt may indicate that the conference will not proceed unless conference participants are in agreement. Alternatively or in addition, 'superior' negotiating privileges may be provided to specially-designated clients. Thus, a client wishing to distribute some electronic material, such as a first draft of a book, may electronically acquire an ability to block all other users from joining an electronic conference until conference participants agree that the electronic conference may not be reproduced or archived.

When content restrictions support establishing a conference, the host 903 launches a probe for compliance with content restrictions (940). For example, when the host 903 identifies an acceptable set of content restrictions for the conference, the host 903 may check whether participating clients comply with the content restrictions (e.g., when no stream ripping is permitted, the host may confirm that the participating clients are not running programs capable of stream ripping).

Clients 901 and 902 probe for compliance with content restrictions (945). For example, the host 903 may launch a security-checking software program on each of the participating clients. The probe scans the clients and determines whether the client complies with the content restrictions established for the electronic conference. In one example, the probe reports, blocks, or disables software/features that violate content restrictions established for the electronic conference. Separately or in addition, the probe may block client access to the electronic conference until the client manually configures his/her system to comply with the content restrictions. Thus, if use of stream ripping programs is not permitted, the probe may scan the client for stream ripping programs and block client access to the conference when a stream ripping program is found in client memory. In another example, if content restrictions disallow screen capture, the probe may disable any software or keyboard shortcuts used for screen capture on the client.

When the host 903 determines that clients 901 and 902 comply with the content restrictions, the host 903 establishes the electronic conference in accordance with content restrictions (950) and enables clients 901 and 902 to access the electronic conference (955). Clients 901 and 902 then access the electronic conference (960).

Figure 10:
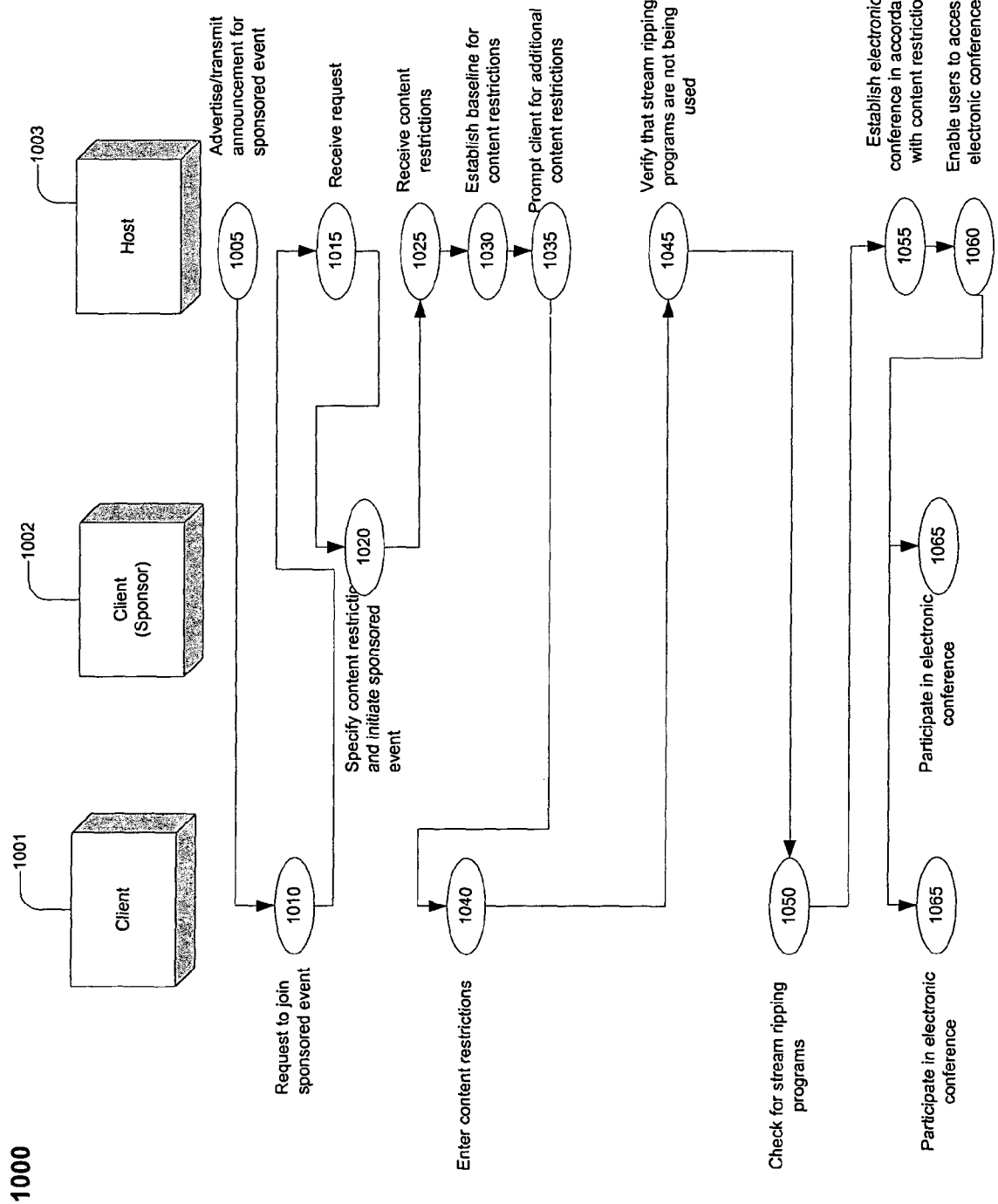
FIG. 10 is a flow chart of an exemplary process by which one or more non-sponsored clients may participate in an event sponsored by a client.

Referring to FIG. 10, a flow chart 1000 illustrates an exemplary process by which one or more non-sponsoring clients 1001 may participate in an event sponsored by a client 1002. For convenience, particular components and messaging formats described earlier are referenced as performing the process. Similar methodologies may be applied in other implementations where different components are used to define the structure of the system, or where the functionality is distributed differently among the components shown. Typically, flow chart 1000 relates to architectures where the client 1002 sponsors an event and distributes the content to one or more non-sponsoring clients 1001 through the host 1003. Such an event may be a chat session with a celebrity or a webcast of a music concert, sports event, or any other live/recorded media presentation. In each of the situations described above, the sponsoring client 1002 may want to impose content restrictions on the non-sponsoring client 1001 to protect his/her intellectual property rights for the distributed content.

Initially, the host 1003 advertises and/or transmits an electronic announcement for sponsored event to the non-sponsoring client 1001 (1005). The announcement may appear in a form of a web page inviting the client 1001 to click on a link to connect to the online event. In another example, the host 1003 may advertise directly to the client 1001 through a chat program, an Instant Messenger (IM) application, a media player application, or other client software.

The non-sponsoring client 1001 then requests to join the sponsored event (1010). In general, requesting to join the event is generated by client software that allows the client 1001 to exchange information with corresponding software running on the host system 1003. The host 1003 receives an electronic request from the non-sponsoring client 1001 to join the event (1015). The host 1003 then prompts the sponsoring client 1002 to initiate the event and to specify the desired content restrictions. The sponsoring client 1002 may specify content restrictions regulating the subsequent reproduction of the content generated during the event. Other examples of content restrictions may include, but are not limited to, preferences related to screen capture, stream ripping, or archiving. The sponsoring client 1002 then specifies content restrictions and initiates the event (1020).

The host 1003 receives content restrictions from the sponsoring client 1002 (1025). The host 1003 establishes a baseline for content restrictions (1030). The baseline for content restrictions includes the minimum requirements established by the sponsoring client 1002 for the event. To join the event, the non-sponsoring client 1001 has to comply with the content restrictions specified by the sponsoring client 1002. Once the host 1003 establishes the baseline content restrictions, the host the non-sponsoring client 1001 for additional content restrictions (1030). In response, client 1001 may specify additional content restrictions. For example, client 1001 may specify content restrictions that apply to content generated by client 1001, such as content restrictions indicating that other participating clients may not archive inputs from client 1001 during the event (1040).

Once the host 1003 receives the content restrictions, host 1003 verifies that client 1001 complies with the established restrictions. For example, the host 1003 may verify that stream ripping programs are not being used (1045). The client 1001 checks for stream ripping programs (1050). Separately or in addition, the host 1003 may block access to the event for the client 1001 until the client 1001 complies with the other content restrictions for the event.

When the host 1003 determines that the client 1001 complies with the content restrictions including those content restrictions provided by the sponsoring client 1002, the host 1003 enables the client 1001 to access the sponsored event (1060). Clients 1001 and 1002 then participate in the event (1065).

Figure 11:
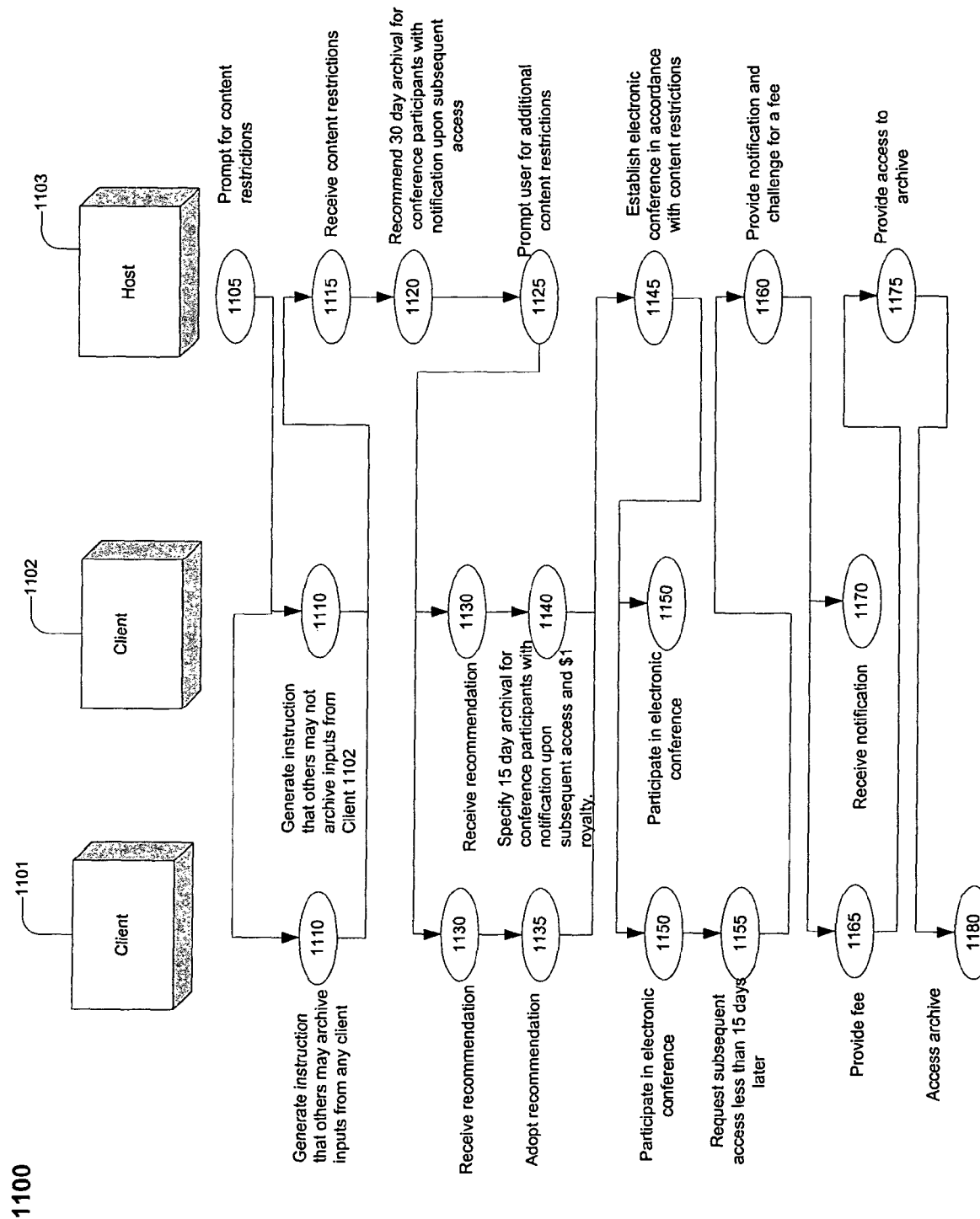
FIG. 11 is a flow chart of an exemplary process by which clients generate content restrictions for archiving and later access archived content through the host.

Referring to FIG. 11, flow chart 1100 illustrates an exemplary process by which clients 1101 and 1102 generate content restrictions for archiving and later access archived content through the host 1103. For convenience, particular components and messaging formats described earlier are referenced as performing the process. However, similar methodologies may be applied in other implementations where different components are used to define the structure of the system, or where the functionality is distributed differently among the components shown.

Initially, the host 1103 prompts participating clients 1101 and 1102 to specify content restrictions (1105). Clients 1101 and 1102 generate electronic instructions to the host 1103 (1110). Client 1101 generates an instruction that others may not archive inputs from any client, while client 1102 generates an instruction that others may not archive inputs from client 1102. For example, client 1102 may want to retain intellectual property rights to the content they distribute during the conference, and, hence, may wish to block other clients from either archiving or accessing that content.

Once the host 1103 receives the electronic instructions specifying content restrictions for clients 1101 and 1102 (1115), the host 1103 analyzes the received restrictions and proposes a compromise for content restrictions for the electronic conference (1120). As shown, host 1103 may recommend a 30 day archival for conference participants with notification upon subsequent access (1120), and may prompt clients 1101 and 1102 for additional content restrictions (1125).

Clients 1101 and 1102 receive the recommendation (1130). Client 1101 adopts the recommendation (1135). Client 1102 modifies the recommendation. In particular, the client 1102 specifies a 15-day archival for conference participants with notification upon subsequent access and a fee (e.g., a $1 royalty) (1140). Put differently, the content restrictions from client 1102 require that any client requesting access to the archived content must (1) be a conference participant and (2) do so within a 15-day period by paying a fee to the client 1102.

The host 1103 receives the content restrictions and elects to terminate the negotiations by accepting the content restrictions from client 1102. Upon agreement by the client 1102, the host 1103 establishes the electronic conference in accordance with the content restrictions (1145). Clients 1101 and 1102 then participate in the conference (1150), which is archived on the host 1103 according to the content restrictions. Archiving content may include enabling subsequent access to the content through various user software interfaces, such as web pages or an Instant Messenger (IM) interface.

Within fifteen days of the electronic conference's completion, client 1101 may request access to the archived content (1155). As described above, client 1102 receives notification (e.g., through a web page, instant messenger, or other user interface) (1170). The host 1103 receives the request from the client 1101, notifies the client 1102 about the request, and challenges client 1101 for a fee (1160). The client 1101 provides the fee (1165), and the host 1103 enables the client 1101 to access the archive (1175). At that point, the client 1101 accesses the archive (1180).

Other implementations are within the scope of the following claims. For example, the content restrictions may regulate the use and/or insertion of a watermark to identify how the content is being used. The watermark may be used to identify a conference participant affiliated with improper use. For example, before enabling access to an archive of content to a conference participant, an electronic conference may instruct a content distributor to insert a discrete watermark identifying the conference participant requesting the archive. In the event that the content is improperly distributed thereafter, the watermark may be used to identify the conference manager as the source of the improper distribution.

The conference manager may be configured to support a diverse community of device types. For example, the conference manager may support access to a video conference by PCs, wireless PDAs, and wireless phones. If the wireless phone has a different capability, the conference manager may structure the negotiations, content restrictions, and content to accommodate differences in the underlying capability. For example, if the wireless phone lacks the ability to chat, record streams, and access archives of content, the conference manager may simplify the prompt for negotiations so that only parameters relating to a wireless phones capability are provided (e.g., can content provide by the wireless phone be archived?). Similarly, the conference manager may adjust the bit rate to accommodate different network constraints associated with wireless networks. Finally, the conference manager may interact with features on one platform that are not available on other platforms. For example, if wireless phones with video cameras and PCs without video cameras are used as clients in an electronic conference, the wireless phones may be presented with content restrictions to video.

What is claimed is:

1. A method of administering access to an electronic conference with a plurality of users over a network, the network including at least one host device and a plurality of client devices, the method comprising:
   receiving at the host device, an electronic instruction configured to establish the electronic conference;
   enabling more than one user of the plurality of users to generate content restrictions that limit content rendered during the electronic conference,
   wherein each of the more than one user is associated with one of said client devices;
   receiving at the host device, proposed content restrictions provided by each of the more than one user;
   comparing, by the host device, the proposed content restrictions received from each user of the more than one user to the content restrictions received from each other user of the more than one user;
   identifying one or more disputed parameters in the proposed content restrictions based on the comparing,
   prompting each client device associated with the more than one user to resolve the disputed parameters by:
      automatically identifying, based on identifying the one or more disputed parameters, a list of potential solutions;
      presenting, to a conference administrator in association with the disputed parameters, a list of potential solutions that may be selected by the user in order to identify a solution to the disputed parameters,
      asking the more than one user to select a value, from among the list of potential solutions, for the disputed parameters,
      determining if a value from the list of potential solutions is agreed-to by the more than one user based on the more than one user selecting a value in response to the asking the more than one user to select the value,
      removing parameters having less than a threshold of support, and
      using the selected value as the value for the disputed parameters if the value is agreed-to by the more than one user;
   locking down agreed-to parameters appearing in the proposed content restrictions so that the more than one user cannot change a status of the agreed-to parameters;
   enabling the more than one user to engage in continued negotiations to resolve remaining disputed parameters of the one or more disputed parameter while precluding the more than one user from modifying the agreed to parameters that have been locked down;
   analyzing one or more participant devices to ensure compliance with the content restrictions;
   establishing the electronic conference in accordance with the content restrictions; and
   enabling user access to the electronic conference consistent with the content restrictions.

2. The method of claim 1 further comprising enabling access to the electronic conference through a telephone network.

3. The method of claim 1 further comprising enabling access to the electronic conference through an instant messaging interface.

4. The method of claim 1 wherein enabling user access to the electronic conference includes regulating which user identities are subsequently allowed to access reproductions of the electronic conference.

5. The method of claim 1 wherein enabling user access to the electronic conference includes regulating which systems are subsequently allowed to access reproductions of the electronic conference.

6. The method of claim 1 wherein enabling user access to the electronic conference includes regulating which streams of content within the electronic conference may be accessed.

7. The method of claim 1 further comprising:
   negotiating a watermark capability between the users prior to establishment of the electronic conference; and
   inserting into content of the electronic conference a watermark indicative of the content restrictions.

8. The method of claim 1 wherein identifying the disputed parameters includes identifying parameters in the proposed content restrictions for which all of the more than one users do not agree.

9. The method of claim 1 wherein identifying the disputed parameters includes identifying parameters in the proposed content restrictions for which a majority of the more than one user do not agree.

10. The method of claim 1 wherein removing parameters having less than a threshold of support includes removing parameters that none of the users supported, removing parameters that less than a specified portion of users supported, and removing parameters that less than a specified number of users supported.

11. The method of claim 1 wherein prompting the more than one user to resolve the disputed parameters includes removing parameters associated with a greater risk for improper use.

12. The method of claim 1 wherein prompting the more than one user to resolve the disputed parameters includes enabling the users to select from smaller subset of default parameters.

13. The method of claim 1 further comprising
receiving proposed content restrictions provided by the more than one user;
comparing the proposed content restrictions;
identifying one or more disputed parameters in the proposed content restrictions; and
substituting the disputed parameters with default parameters.

14. The method of claim 1 further comprising
receiving proposed content restrictions provided by the more than one user; comparing the proposed content restrictions;
identifying one or more disputed parameters in the proposed content restrictions;
engaging in a limited exchange of prompts with the more than one user to resolve the disputed parameters by highlighting the disputed parameters and asking the more than one users to select a value for the disputed parameters; and
after the limited exchange of prompts has been performed, substituting the disputed parameters with default parameters.

15. The method of claim 1 further comprising:
receiving content restrictions from the more than one user that differ by at least parameter between different users; and
assimilating the content restrictions into an electronic agreement.

16. The method of claim 15 wherein assimilating the content restrictions into an electronic agreement includes exchanging proposals and counterproposals until all conference participants agree to identical content restrictions.

17. The method of claim 16 wherein agreeing to identical content restrictions includes agreeing to allow a first user to have a different capability than a second user.

18. The method of claim 15 wherein assimilating the content restrictions into the electronic agreement includes exchanging proposals and counterproposals until a majority of users agree to identical content restrictions.

19. The method of claim 15 wherein assimilating the content restrictions into the electronic agreement includes exchanging proposals and counterproposals using content restrictions provided by a conference manager designated as required parameters and using other content restrictions that are not required parameters.

20. The method of claim 19 wherein assimilating the content restrictions into the electronic agreement includes:
enabling a limited exchange of proposals and counterproposals;
identifying compromise parameters likely to be acceptable to one or more users; and
using the compromise parameters for the electronic agreement.

21. The method of claim 1 wherein establishing the electronic conference includes enabling one or more users to exchange sidebar communications, wherein the sidebar communications represent private communications exchanged between a user-defined subset of conference participants.

22. The method of claim 21 wherein enabling user access to the electronic conference consistent with the content restrictions includes selectively enabling users to exchange sidebar communications consistent with sidebar-oriented content restrictions.

23. The method of claim 1 wherein enabling one or more users to generate content restrictions includes enabling a user to specify a user to
(1) use screen capture software,
(2) use stream recording software,
(3) access archived content,
(4) refuse participation when other users do not agree to specified content restrictions,
(5) require specified content restrictions,
(6) specify how input from the user may be used, or
(7) specify that a royalty must be paid.

24. The method of claim 1 wherein analyzing the participant devices includes probing for screen capture software, stream recording software, or an electronic microphone attached to the participant device.

* * * * *

UNITED STATES PATENT AND TRADEMARK OFFICE
CERTIFICATE OF CORRECTION

| | | |
|---|---|---|
| PATENT NO. | : 7,707,262 B1 | Page 1 of 1 |
| APPLICATION NO. | : 11/022928 | |
| DATED | : April 27, 2010 | |
| INVENTOR(S) | : Bill | |

It is certified that error appears in the above-identified patent and that said Letters Patent is hereby corrected as shown below:

In claim 1, column 19, lines 61-62, "plurality of client devices" should read -- plurality of devices --.

In claim 1, column 20, line 4, delete "each of" after -- provided by --.

In claim 1, column 20, line 6, delete "user" after -- each --.

In claim 14, column 21, line 34, start new line before "comparing".

Signed and Sealed this

Twenty-fourth Day of August, 2010

David J. Kappos
*Director of the United States Patent and Trademark Office*